United States Patent
Squyres et al.

(10) Patent No.: US 7,293,813 B2
(45) Date of Patent: Nov. 13, 2007

(54) DOUBLE JOINTED HINGE AND FOLDABLE DECK USING SAME

(76) Inventors: Jerrell P Squyres, 14320 Southern Pines, Dallas, TX (US) 75234; Kelly Lee Miller, 1359 F.M. 17, Grand Saline, TX (US) 75140; Randall S. Speed, 2871 Howard Rd., Waxahachie, TX (US) 75165; Travis D. Moffett, CR. 2920, Golden, TX (US) 75444; Brenda K. Scott, 25847 CR 462, Mineola, TX (US) 75773; Steven Kent Sosebee, 505 Odom St, Cumby, TX (US) 75433

( * ) Notice: Subject to any disclaimer, the term of this patent is extended or adjusted under 35 U.S.C. 154(b) by 211 days.

(21) Appl. No.: 11/126,808

(22) Filed: May 11, 2005

(65) Prior Publication Data

US 2006/0255609 A1    Nov. 16, 2006

(51) Int. Cl.
*B62D 33/02* (2006.01)
(52) U.S. Cl. ............... 296/24.44; 105/372; 16/360; 16/361; 16/366
(58) Field of Classification Search ............ 296/24.44; 105/372, 375; 16/356–361, 366, 368; 49/383; 14/69.5
See application file for complete search history.

(56) References Cited

U.S. PATENT DOCUMENTS

| | | | | |
|---|---|---|---|---|
| 1,648,331 A | * | 11/1927 | Soule | 16/360 |
| 2,838,857 A | * | 6/1958 | Allin, Jr. et al. | 172/823 |
| 3,183,872 A | * | 5/1965 | McLaughlin | 114/201 R |
| 3,875,871 A | * | 4/1975 | Thornton et al. | 105/375 |
| 3,911,832 A | | 10/1975 | Vandergriff | |
| 4,281,870 A | * | 8/1981 | Ehrlich et al. | 296/24.44 |
| 4,418,805 A | * | 12/1983 | Wolff | 206/279 |
| 4,995,322 A | * | 2/1991 | Frederick | 108/44 |
| 5,042,863 A | * | 8/1991 | Fraga | 296/24.44 |
| 5,265,954 A | * | 11/1993 | Keil | 312/405 |
| 5,314,276 A | | 5/1994 | Barone | |
| 5,452,972 A | | 9/1995 | Adams | |
| 5,738,179 A | * | 4/1998 | Matsui | 180/69.21 |
| 5,992,918 A | * | 11/1999 | Gobart et al. | 296/146.13 |
| 6,353,970 B1 | * | 3/2002 | Spaeth | 16/360 |
| 6,494,280 B1 | * | 12/2002 | Friend et al. | 180/69.2 |
| 6,585,306 B1 | * | 7/2003 | Smith et al. | 296/24.44 |
| 6,854,400 B2 | | 2/2005 | Sullivan | |

FOREIGN PATENT DOCUMENTS

DE    199 02 897 A1 *  7/2000

* cited by examiner

*Primary Examiner*—Dennis H. Pedder
*Assistant Examiner*—Mike Hernandez
(74) *Attorney, Agent, or Firm*—Vincent J. Allen; Carstens & Cahoon, LLP

(57) ABSTRACT

A foldable deck for supporting cargo in a freight compartment is provided. The foldable deck includes a pair of deck panels connected by a double jointed hinge. The foldable deck is mounted on one of the side walls of the freight compartment and is capable of movement between a secure upright position and an extended horizontal deployed position. When the deck panels are in their deployed position they at least partially define a platform above the floor of the vehicle freight compartment. The double jointed hinge has a hinge member having a pair of pivot pins and slot pins that alternate between a deployed position and an upright position. The free end rests upon a channel or catch rail on the free wall opposite the attachment wall.

21 Claims, 6 Drawing Sheets

DOUBLE JOINTED HINGE AND FOLDABLE DECK USING SAME

BACKGROUND OF THE INVENTION

1. Technical Field

The invention relates to intermediate deck structures for use in transport vehicles such as trucks and trailer vans, railway cars, freight containers and the like, and more particularly, to a foldable deck for use in such vehicles.

2. Description of Related Art

In a typical truck van, a horizontal bed or floor is provided for supporting articles being transported. Articles are placed on this bed, and depending upon the size of the articles, they may be stacked upon each other at two or more levels.

In some instances, it may be impractical to stack the articles due to the weight or configuration. Where this is the case, a substantial amount of the vehicle interior is rendered unusable. For example, where the articles or containers are fragile, damage to the articles will occur if stacked to the extent that the weight of the upper articles would damage lower articles. In those instances, it is often necessary to avoid stacking or to minimize the amount of stacking.

Further, to maximize volume capacity of transporting small to medium sized freight and to reduce the risk of crushing packages, shipping companies have sought to add shelves inside tractor trailers. The shelf span is from wall to wall and separates the trailer volume into spaces below and above the shelf.

Some articles are also somewhat difficult to handle due to their weight and configuration. This creates problems for the individuals loading the articles on a bed. Thus, even if articles at a lower level will not be damaged when other articles are stacked thereon, stacking itself may be quite cumbersome and inefficient due to the size and weight of the articles.

To facilitate loading and unloading the shelf-equipped trailer, the shelf can be divided into approximately two foot-wide sections and be designed to fold up against the wall. As cargo is loaded into the trailer from the front to the rear, each shelf section is individually folded down away from the wall and loaded with cargo. Various types of collapsible or removable intermediate deck structures have been proposed for supporting freight articles of various shapes and weights above the horizontal bed or floor of a transport van, and the like, in order to increase the load carrying ability of a van and to maximize the use of the available cubic capacity of a van. Such attempts of using intermediate decks in vehicles are discussed by U.S. Pat. Nos. 6,585,306, 6,854,400, 5,452,972, and 3,911,832.

The use of collapsible or removable intermediate decks has not met with wide success, however, due to inefficiencies in the design of the decks which make them too complex, too expensive for practical purposes, or simply too inconvenient to use.

As discussed in U.S. Pat. No. 6,585,306, the design of existing intermediate deck structures often consist of two deck panels, hinge mounted on opposing walls to enable storage of the deck panels vertically against the side walls. The deck panels rotate downwardly or upwardly on the hinges to a horizontal position to form a continuous section of deck, or secondary floor. Typically, this form requires a means of supporting the deck halves horizontally in a manner which both encroaches on additional usable volume for loading the freight or cargo, and interferes with that space requiring extra effort and time to load around it. Such supports include cantilever support structures, suspension chains or cables or even vertical support legs extending to the primary floor.

One problem with prior art solutions is that they fail to provide the necessary ergonomic features required when changing from a secure, upright position into an extended horizontal position. For example, it is highly desirable, for safety concerns that pinch points be minimized or eliminated to prevent the accidental severing of a finger. Hence, deck panels using slidable members to engage and lock deck panels together are undesirable. Similarly, deck panels using latch-type devices that can provide a pinch point are undesirable. Further, human movement required to change the position of the deck should minimize hand and arm movements above the shoulders and below the waist to reduce or eliminate potential back injury.

Consequently, there is a need for a system for supporting articles for transportation purposes. In particular, there is a need for such a support system that is of a highly efficient design whereby the deck can be economically installed in a vehicle and the system can be safely, efficiently, and ergonomically operated by a single user.

SUMMARY OF THE INVENTION

These and other objects and advantages are met by the present invention which, in one aspect, includes a foldable deck for supporting cargo in a vehicle freight compartment having spaced apart side walls.

In one aspect, the present invention includes a double jointed hinge that can be connected to a pair of deck panels. The hinge includes components that are sized to avoid pinch points as the hinge travels between upright and deployed positions.

In one aspect, the foldable deck includes a first deck panel pivotally attached to a first wall connected by a double jointed hinge to a second deck panel removably secured to a second wall such that the foldable deck is capable of movement between an upright, storage position and a horizontal, deployed position. When the foldable deck is in the deployed position, it forms a secondary platform of the vehicle freight compartment. In one aspect, the foldable deck also includes a retaining magnet and/or one or more struts to help secure the foldable deck to the side wall in the upright position.

Advantageously, the deck support system of the present invention supports articles more efficiently than prior art systems for transportation purposes. In particular, the deck support system is lightweight and is of highly efficient design whereby the deck can be economically installed in a vehicle, each individual intermediate deck is adequately supported, and the system can be safely and ergonomically operated by a single user.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings wherein:

DETAILED DESCRIPTION

While the invention is described below with respect to one or more preferred embodiments, other embodiments are possible. The concepts disclosed herein apply equally to other systems for providing a folding support shelf for cargo areas in a storage unit including a cargo vehicle. A cargo vehicle may include any cargo vehicle, including semi-trailers, trucks, aircraft, etc. It will be readily apparent to those skilled in the art that various modifications, rearrangements, and substitutions can be made without departing from the spirit of the invention. The scope of the invention is defined by the claims appended hereto.

Figure 1A:
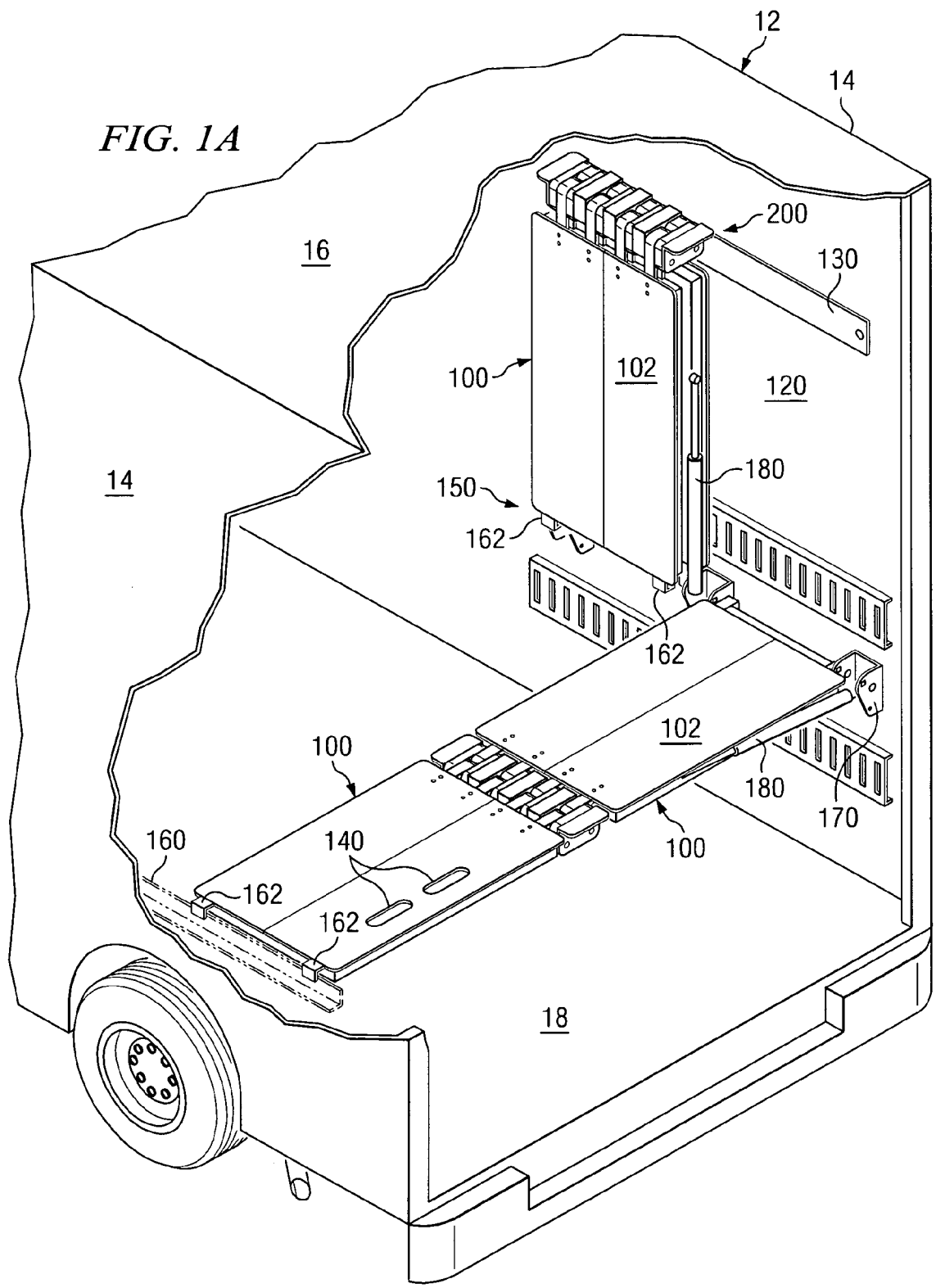
FIG. 1A is a perspective view, partially cutaway, of the rearward portion of a truck trailer including an embodiment of the foldable deck in accordance with the present invention.

FIG. 1A is a perspective view, partially cutaway, of the rearward portion of a truck trailer including an embodiment of the foldable deck in accordance with the present invention. As depicted in FIG. 1A, the foldable deck 100 is installed on a truck trailer 12. The truck trailer 12 is enclosed by side walls 14, a roof 16 and a floor 18. In one aspect, the foldable deck 100 is secured to the mounting sidewall 120 by a wall mounting bracket 170 and comprises a free end 150 having a pair of catch fingers 162 for placement into a catch rail 160. While the illustrated embodiment and the following description describe the foldable deck 100 of the present invention in conjunction with a tractor trailer, the foldable deck need not be used in conjunction with a tractor trailer, but can instead be used in conjunction with various types of freight transport vehicles or devices such as railway cars, airplanes or transport containers.

As depicted in FIG. 1A, a novel hinge assembly 200 permits the foldable deck to be easily converted from an upright, secure storage position to a horizontal, deployed position and back to an upright, secure position. A pair of hand holds 140 can help facilitate such operation. Further, although only two decks are shown (one in the upright position and one in the deployed position), the foldable deck 100 can comprise a plurality of the deployable decks along a mounting sidewall 120. When the foldable deck 100 is in the deployed position, the system defines a secondary platform in the vehicle freight compartment. A pair of struts 180 can be attached to permit easier movement between the upright and the deployed positions.

Figure 1B:
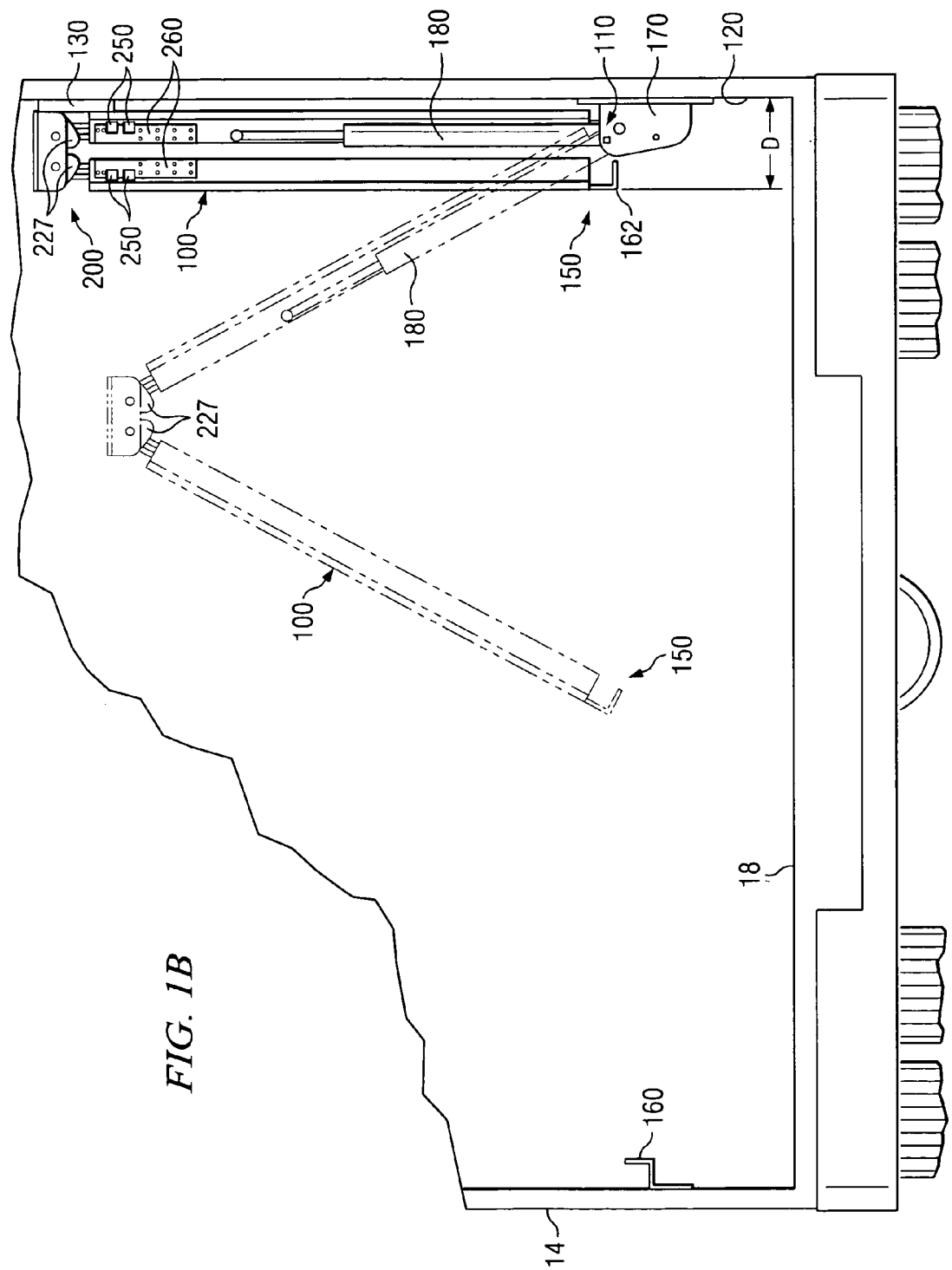
FIG. 1B is a side elevational view of the foldable deck in the upright position in accordance with one embodiment of the present invention.

FIG. 1B is a side elevational view of the foldable deck in the upright position in accordance with the present invention. The foldable deck 100 can be easily moved by an operator from the upright position to a deployed position and vice versa. In one embodiment, a strip 130 of steel is mounted to the mounting sidewall 120 of the freight compartment and secures a magnet disposed upon the link or hinge members of foldable deck 100 to the mounting sidewall 120 when the foldable deck 100 is in the upright position. In one embodiment, the strip 130 comprises a magnet mounted to the mounting sidewall 120 of the freight compartment and secures the foldable deck 100 to the mounting sidewall 120 when the foldable deck 100 is in the upright position. Such embodiment permits a latch-free operation further eliminating a potential pinch point and resulting in greater safety for the operator. In one aspect, the foldable deck 100 comprises a pivot end 110 that is attached to the mounting sidewall 120 by a wall mounting bracket 170. In one embodiment, the wall mounting bracket 170 is also used to connect a strut 180 to the foldable deck. In one embodiment, the foldable deck 100 comprises one strut 180.

Figure 1C:
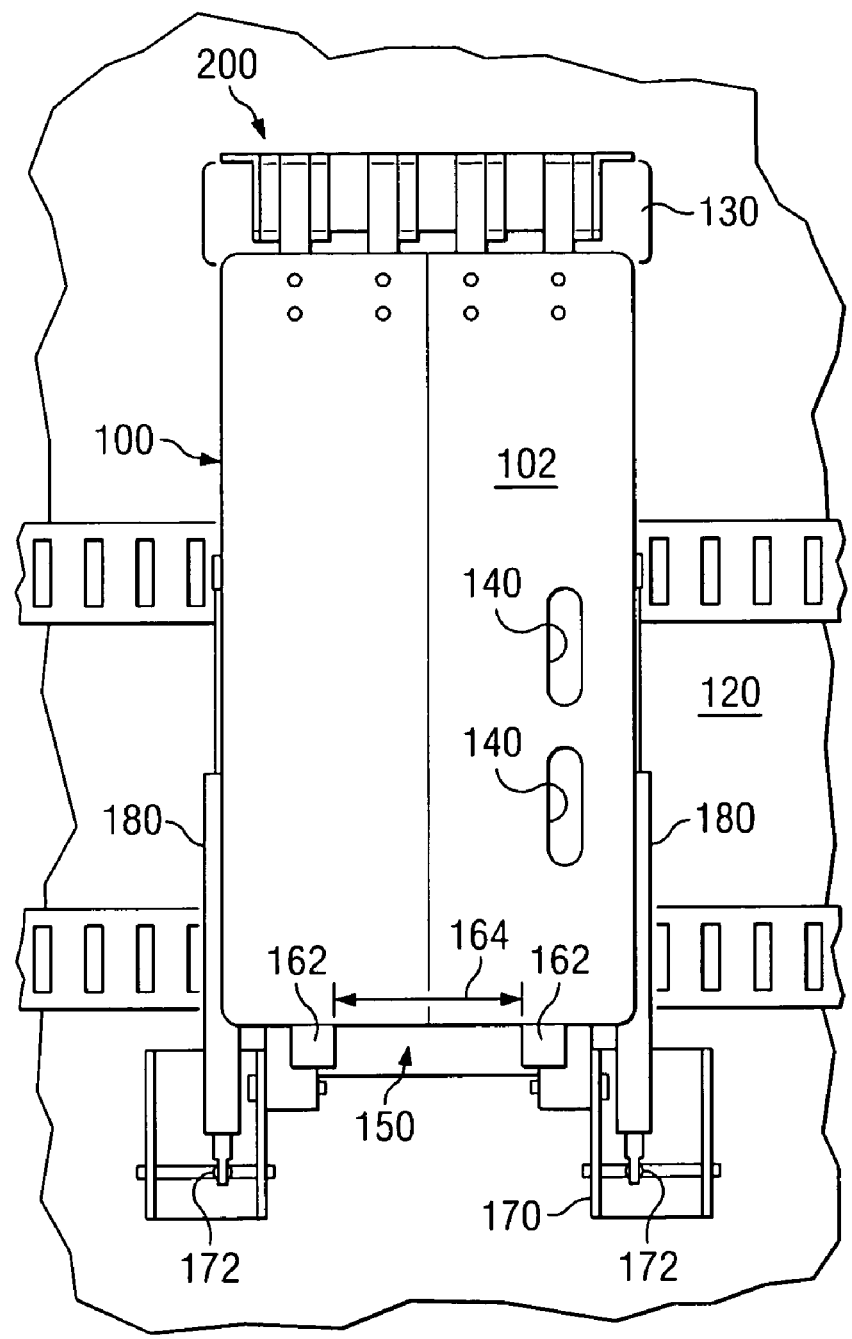
FIG. 1C is a front elevational view of the foldable deck in the upright position in accordance with one embodiment of the present invention.

FIG. 1C is a front elevational view of the foldable deck in the upright position in accordance with the present invention. In a preferred embodiment, and referring to FIGS. 1B and FIGS. 1C, the foldable deck comprises two independent struts 180, one on each side of the deck 100, for redundancy. Two struts 180 can be used to enhance the safety, load balance, and to keep stress levels on the foldable deck 100 low. In one embodiment, a single mounting bracket 170 is used to hold struts 180 for adjacent decks. In one embodiment, the strut 180 comprises a mechanical spring strut further comprised of a nested coaxial set of springs enclosed in a steel housing. Although a pneumatic or gas strut can be used, it has been found that a mechanical spring strut has a longer lifespan and does not degrade as fast as a pneumatic strut in the tortuous, vibratory conditions that can be imparted, especially when the trailer is traveling through bumpy road conditions. In addition, loads imparted by pneumatic struts can be impacted more by temperature variations than mechanical struts. In one embodiment, one strut 180 can be designed to automatically lock as the foldable deck 100 is folded against the wall. In an alternative embodiment, the strut 180 can comprise a gas strut. When folded up against the wall 120, the deck 100 can be held in place by a force provided by the strut(s) 180. In one embodiment, as best depicted by FIG. 1C, the mounting bracket 170 comprises a pin further comprising a ball 172. The strut 180 is mounted on the ball 172 to permit slight rotation of the strut 180. Such embodiment is advantageous as it permits the strut to swivel and rotate, thereby preventing the pin from breaking due to torsion on the joint that can easily occur from load spikes from, for example, bumpy road conditions during transport. The mounting bracket 170 can be welded to a flat length of a pre-drilled steel plate mounted on the mounting sidewall 120.

One advantage of using one or two struts 180 is that it permits the operator to raise and lower the foldable deck 100 with less lifting or pulling force. In one embodiment, no more than 25 pounds of lifting or pulling force is required by an operator to move the foldable deck 100 from the upright position to a deployed position and vice versa. This low operational lifting and pulling requirement minimizes possibility of back strains to the operator. Further, the foldable deck 100, in accordance with one embodiment of the present invention, can be folded up or down by an operator standing to the side of the deck 100. This reduces the possibility of injuries if the operator were required to stand directly in front of the deck 100 to either deploy or secure it upright. Another advantage provided by struts 180 is the protection offered against damaging load spikes, especially on bumpy roads. In one embodiment, the struts 180 are loaded whether the shelf is in the deployed, horizontal position or folded, upright position. The struts 180 thereby provide lifting assistance and shock absorption.

Figure 2A:
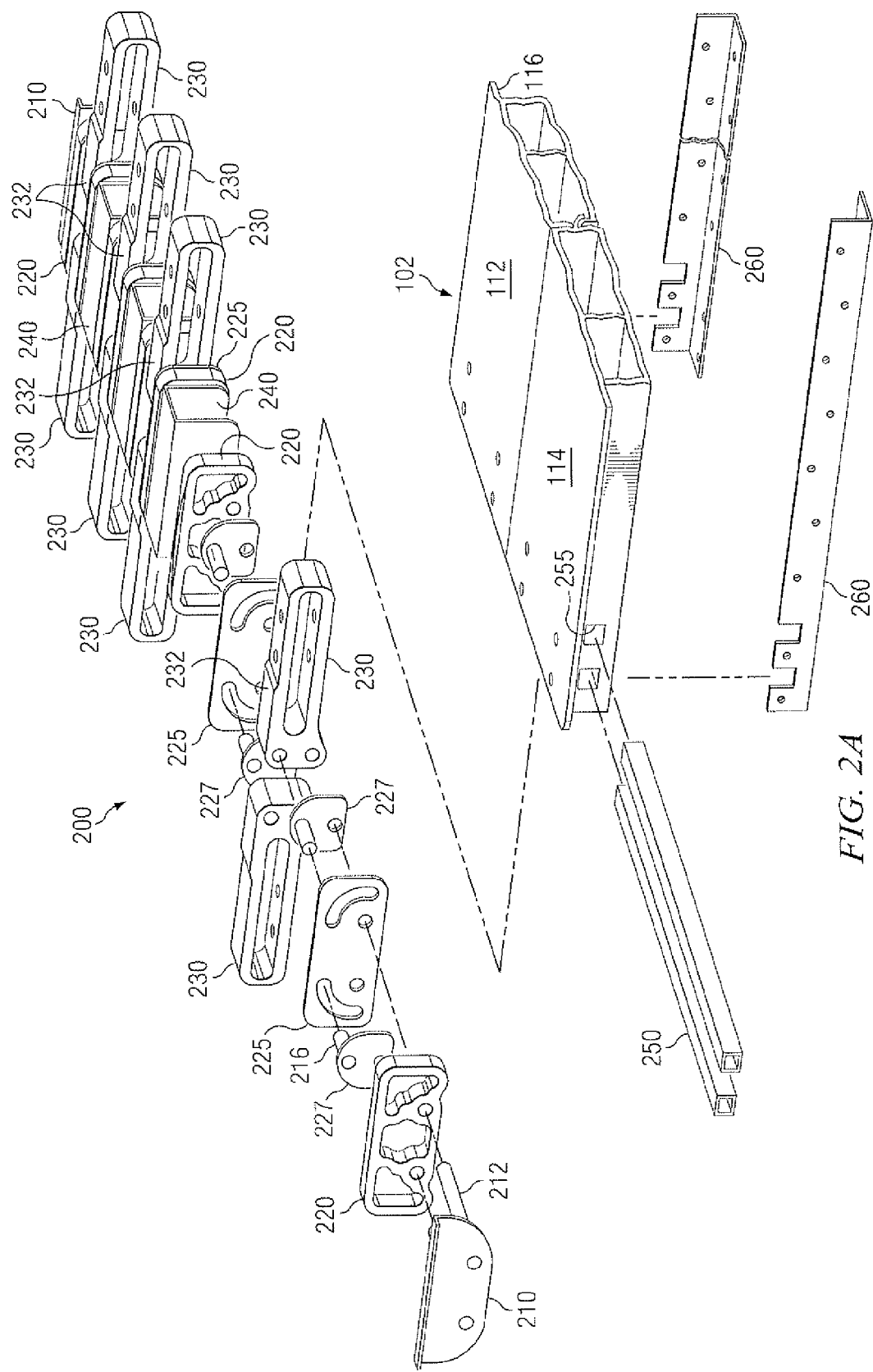
FIG. 2A is a top perspective exploded view depicting components of the deck system and double jointed hinge assembly in accordance with one embodiment of the present invention.

In one embodiment, the deck 100 is locked against the mounting sidewall 120 by a locking strut and held in place by a retaining magnet 232. As the deck is folded up against the mounting sidewall 120, the locking strut 180 lock engages at approximately 3-4degrees from the wall 120. At approximately 2 degrees from the wall, the retaining magnet 232, which can be bonded to the hinge member 230, as best depicted by FIG. 2*a*, becomes attracted to the steel plate 130 mounted on the wall. The lower strut mounting point 172 is below and away from the shelf hinge mounting point on the wall bracket 170 such that the lifting force from the strut 180 onto the foldable deck 100 continues as the deck 100 is folded up against the wall 120. In one embodiment, a residual "pushing" force of approximately 10 lbs is thereby provided against the wall 120 (5 lbs per strut 180). In one embodiment, the retaining magnet 232 provides an additional 15 lbs of retaining force so that a total of only approximately 25 lbs of pulling force is required from the operator to pull the deck 100 away from the wall 120. Further, the retaining magnet 232, by sharing the load of keeping the shelf upright, helps to protect the locking strut from being damaged when the cargo area is subjected to sudden jerks and pulls that can be common in the cargo area when the vehicle is traveling along bumpy roads. Use of a retaining magnet 232 and locking strut in accordance with one embodiment of the present invention provides several advantages over the prior art. The deck can be securely held in the upright position without the use of latches on the mounting sidewall 120 or on the deck 100. Further, the locking strut can automatically lock and be unlocked with a palm-operated release lever. Hence, potential pinch points produced by latches as disclosed by deck systems in the prior art are eliminated.

Referring to FIG. 1A through 1C, in the deployed position, a pair of catch fingers 162 attached to the free end 150 of the deck 100 can be easily set into a catch rail 160. In one embodiment, the inside landing of the catch fingers 162 is about 1½ inches wide. In one embodiment, the top of the catch rail 160 has two bends which provide a 1½ inch horizontal landing and a vertical length to mate with the catch fingers 162. Such design permits a 1½ inch variance in trailer widths and is a 'one size fits all' design. A catch rail 160 can be mounted to the wall in the same manner as the mounting bracket 170. In one embodiment an endcap having a length 164 can be placed in the catch rail 160 between the catch fingers 162 to prevent movement of the deck in the deployed position.

Figure 2B:
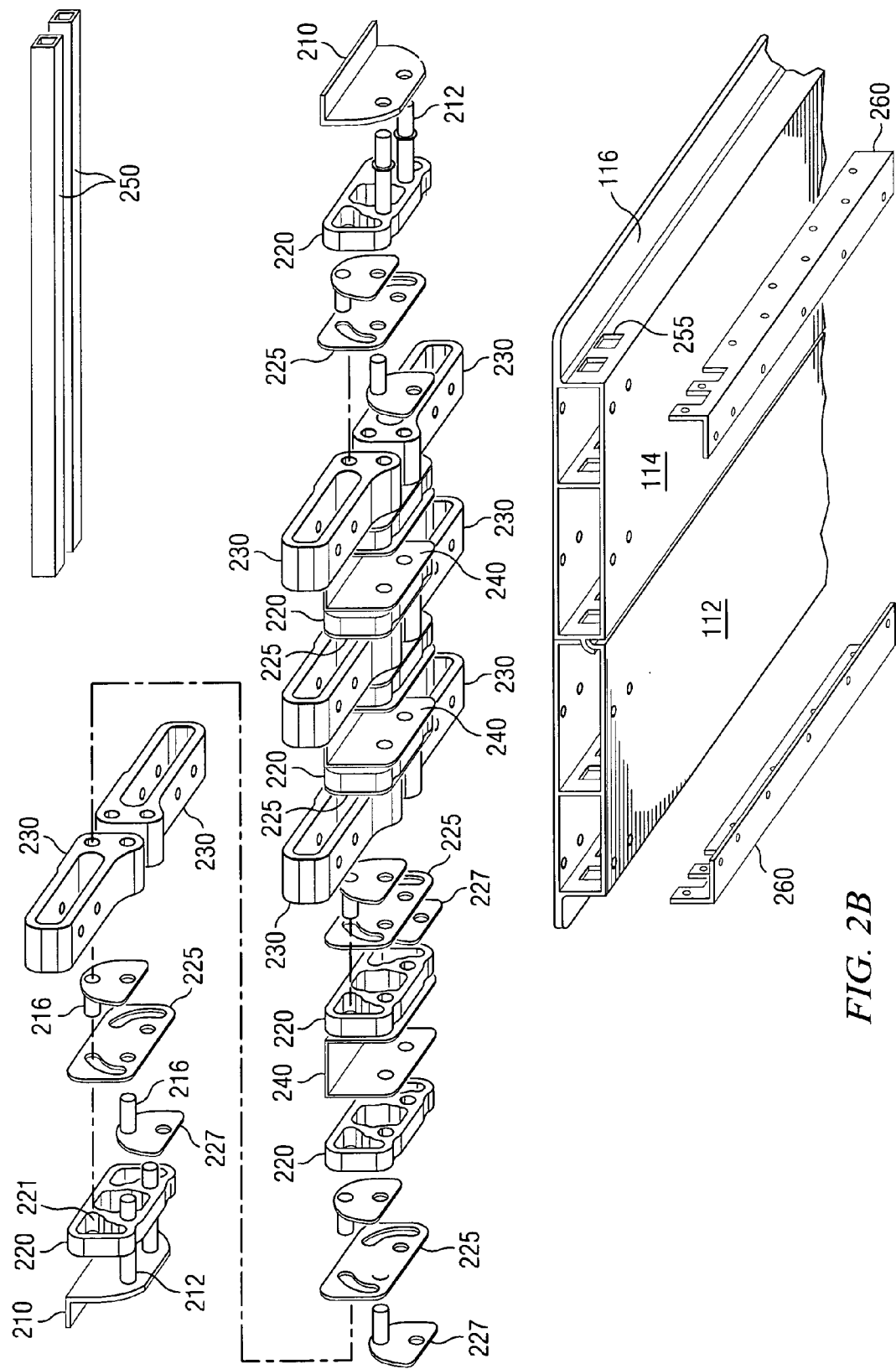
FIG. 2B is a bottom perspective exploded view depicting components of the deck system and double jointed hinge assembly in accordance with one embodiment of the present invention.

FIG. 2A is a top perspective exploded view depicting components of the deck system and double jointed hinge assembly in accordance with one embodiment of the present invention. FIG. 2B is a bottom perspective exploded view depicting components of the deck system and double jointed hinge assembly in accordance with one embodiment of the present invention. The folding deck 100 of the present invention comprises a pair of deck panels 102 connected by a hinge assembly 200. In one embodiment, each deck panel 102 further comprises a male shelf extrusion 114 and a female 112 shelf extrusion. In the embodiment shown, the hinge assembly 200 comprises two end angles 210, eight link members 220, eight opposing hinge members 230, three center members 240, eight slot pins 216, eight pivot pins 212, four torque tubes 250 (two on each side), four torque plates 260 (two on each side), and threaded fasteners to connect the hinge members 230 to the deck panel 102. One advantage of the double jointed hinge assembly of the present invention is that it permits the deck to fold without overlapping hinge parts. Another advantage is that it avoids pinch points common with "butt" type hinges.

It should be noted that the double jointed hinge assembly 200 embodiment depicted in FIGS. 2A and 2B can be effectively utilized with fewer numbers of parts, depending upon the amount of width and safety desired. For example, the double jointed hinge 200, in accordance with an alternative embodiment of the present invention, comprises two end angles 210, two slot pins 212, two pivot pins 216, two opposing hinges 230, and two link members 220. The hinge guards 225 and pivoting hinge guards 227, in such an embodiment, would be optional.

Figure 2C:
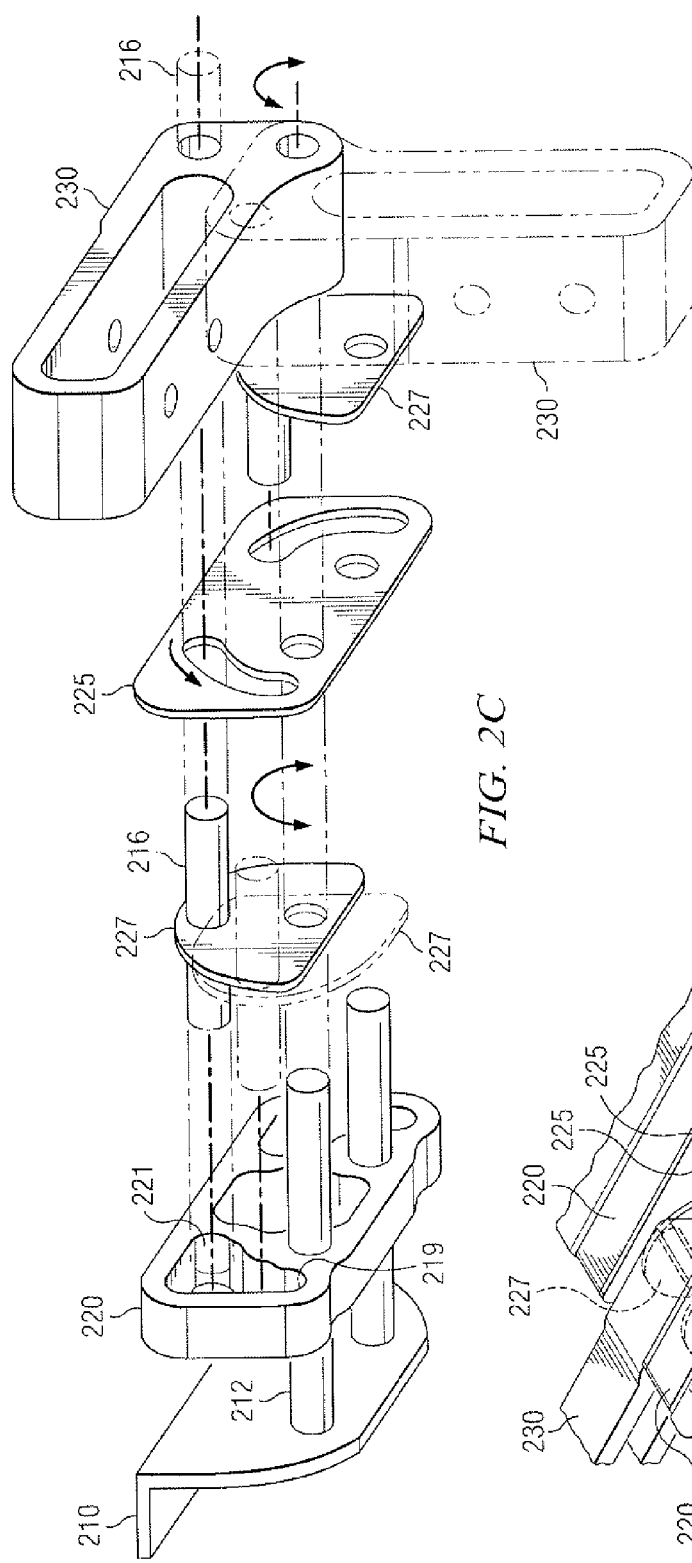
FIG. 2C is a bottom perspective exploded view of some components of a portion of the double jointed hinge assembly depicting the operation of the hinge in accordance with one embodiment of the present invention.
Figure 2D:
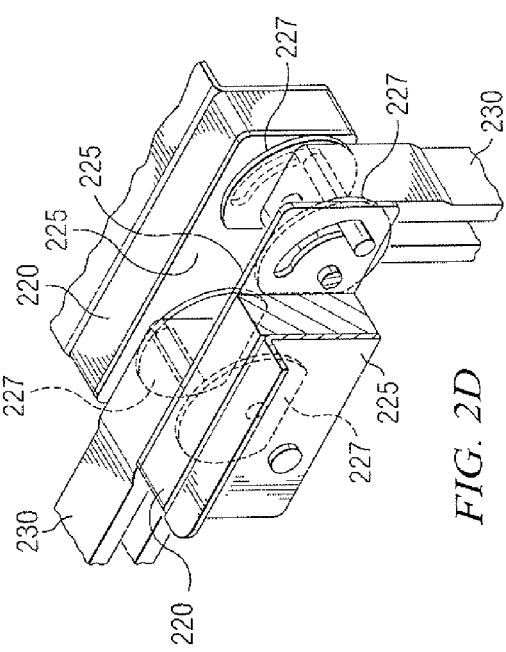
FIG. 2d is a partial cutaway perspective view of some components of a portion of the double jointed hinge assembly depicting the operation of the hinge assembly depicted in FIG. 2c.

FIG. 2C is a bottom perspective exploded view of components of a portion of the double jointed hinge assembly depicting the operation of the hinge in accordance with one embodiment of the present invention, Referring to FIG. 2C, a portion of the double jointed hinge comprises an end angle 210, a link member 220, a first pivoting hinge guard 227, a hinge guard 225, a second pivoting hinge guard 227, and a hinge member 230. The components are held together by two slot pins 216 and two pivot pins 212. In one embodiment, the pivot pin 212 is integral with the end angle 210 and secured with snap rings in center member 240. When the deck is in the deployed position, the slot pin 216 will be in the deployed stopped position 221 of the link member 220. When the deck is in the upright position, the slot pin 216 will be in the upright stopped position 219 of the link member 220. Referring to FIG. 2*c* and FIG. 2*d*. the hinge guard 225 comprises an arc slotted to permit movement of the pivot pin 212 as the slot pin 216 rotates between its deployed stopped position 221 and its upright stopped position 219. The slot pin 216 thereby rotates concentrically about the pivot pin 212. The pivoting hinge guard 227 has a slot pin 216 receiving area (e.g. hole) for the slot pin 216. The pivoting hinge guard 227 thereby rotates along with the slot pin 216. The hinge guard 225 and pivoting hinge guard 227 thereby function to prevent a pinch point that could otherwise potentially occur as the slot pin 216 rotates between the upright 219 and deployed position 221 because the hinge guard 225 and pivoting hinge guard 227 prevent entry to the interior of the link member 220. Although only a single slot pin 216 is depicted, each link member 220 houses two slot pins 216 and two pivot pins 212.

Referring back to FIGS. 2A and 2B, the hinge assembly 200 connects a pair of deck panels 102 together, wherein each deck panel 102 is further comprised of a male shelf extrusion 114 and a female shelf extrusion 112. In one embodiment, each shelf extrusion 112 114 is a low profile 1¾" tall hollow aluminum extrusion. In said embodiment, each shelf extrusion 112 114 is about 11.75-inches wide. The sections are joined by sliding the pair of female 112 male 114 shelf extrusions together at an extruded interlock feature. The shelf extrusions 112 114 are mirror images except for the interlock feature which is made up of a male and female shape. The unique interlock feature provides both high strength and ease of assembly of the two halves requiring no fasteners or welds. It should be pointed out that two shelf extrusions 112 114 are used solely for economical purposes. There are very few extrusion companies that are able to manufacture a product larger than 12 inches in width. Hence, one skilled in the art would recognize that such embodiment is given solely for purposes of illustration and not limitation. Deck panels 102 may or may not be comprised of separate shelf extrusions 112 114. Further, deck panels 102 and shelf extrusions 112 114 can be provided in numerous widths and lengths depending on the size and configuration of the foldable deck 100 desired. In one embodiment, the foldable deck is comprised of two pair of shelf extrusions 112 114 connected by a hinge assembly 200. In one embodiment, the pair of deck panels 102 comprise different lengths such that the hinge assembly 200 is off-center when the foldable deck 100 is in the deployed position. In such an embodiment, a longer length that can be associated with the pivot end 110 and a shorter length can be associated with the free end 150 and vice versa. In one embodiment, the pairs of deck panels 102 comprise substantially equal lengths. In one embodiment, a pair of shelf extrusions is approximately 23.5-inches wide and the foldable deck 100, when in the deployed state, spans the 8-foot width of trailer interior.

In one embodiment, the deck panels 102 are approximately 70% aluminum and 30% steel material to provide an optimal strength to weight ratio. In one embodiment, the deck panels 102 comprise a monocoque construction in which the skin absorbs most of the stresses to which the deck panel 102 is subjected. In one embodiment, the deck panel 102 has a height of 1.75 inches to permit the shelf to fold against the wall and maintain a less than 4 inch clearance D, as shown in FIG. 1B. Hence, when the foldable deck 100 is deployed, the trailer cube space is maximized due to the thin section height (1.75 inches). Further when the foldable deck 100 is upright, the deck clearance D of 4 inches or less permits the deck 100 to be hidden behind the trailer rear door header frame. Such embodiment reduces the likelihood of a forklift, loader, container, or any object going in or out of the trailer interfering with the upright deck 100 during the loading or unloading of cargo. Referring back to FIGS. 2A and 2B, in one embodiment, each shelf extrusion 112 114 features an overhang 116. The overhang 116 can be used to hide the struts or to permit an operator to easily grasp the foldable deck.

In one embodiment, the top surface of the deck panel 102 features lands and grooves, similar to that of a stadium bleacher surface. This type of surface feature is smooth on packages yet slip resistant. Further, the land and groove design channels water giving the deck panel 102 an overall resistance to slipping while walking on it.

As previously stated, the hinge assembly 200 connects a pair of deck panels 102 together. Specifically, the hinge members 230 assemble into the hollow cavity of the shelf extrusions 112 114. In one embodiment, two grade 8 button head screws (e.g. hinge screws) per hinge member 230 are threaded, from the bottom, into flush mounted barrel nuts which connect the hinge members 230 into the shelf extrusions 112 114. Thin stainless steel shim washers keep the low profile screw head as close to the top of the shelf extrusion surface to prevent package hang-ups.

Because the hinge members 230 are hollow, there is an increased tendency for collapse as the hinge screws are tightened. Consequently, a torque tube 250 can be inserted into a cavity in the hinge members 230. In one embodiment, the torque tube 250 is comprised predominantly of steel. As the hinge screws are tightened, the hinge member 230 to torque tube 250 connection becomes more solid. The moment from the hinge assembly can then be transmitted through the hinge members 230 to the torque tube 250. The moment from the hinge assembly travels laterally along the torque tube 250 and through square holes 255 in the vertical walls of the deck panel 102. A large portion of the bending strength in the shelf extrusions 112 114 (e.g. deck panel 102) is due to the vertical walls, which are comprised of two outer walls and one internal rib per shelf extrusion 112 114.

In one embodiment, the torque tube protrudes slightly from holes 255 outside shelf extrusion 112 114 vertical walls where a torque plate 260 attaches. In one embodiment, the torque plate 260 is comprised predominantly of steel. In one embodiment, the torque tube 250 is a ¾ inch square steel tube 20.25 inches long and passes through the cavities of four hinge members 230 on each side of the hinge assembly 200. The torque tube thereby fits into a square slot in the torque plate 260 and transfers the moment through the square slot. A weld is applied to the slot during final assembly. In one embodiment, the torque tube 250 fits snugly through a ¾" hinge member cavity and through a portion 255 of the shelf extrusion and welded to the torque plate 260. The moment from the torque tube 250 can travel primarily through the weld to the torque plates 260, and to the holes 255 in the shelf extrusion 112 114 internal ribs. In one embodiment, the torque plates 260 are fastened to the outside of the outer vertical walls of the deck panel 102 with rivets. The torque plate 260 can convert the moment to a distributed shear into the rivets that attach the torque plate 260 to the outer vertical shelf extrusion 112 114, or deck panel 102 walls. Other attachment means can also be used.

Hence, in one embodiment, fasteners that attach the hinge member 230 to the deck panel 102 fasten the upper and lower skins of the deck panel 102 to the hinge member 230 and clamp the hinge member 230 to the torque tubes 250. Further, the torque tube 250 prevents the hinge members 230 from collapsing when the fasteners or hinge screws are tightened, and transmit the moment from the hinge assembly 200 to the shelf vertical walls of the deck panel 102.

In one embodiment, stainless steel shim washers are used underneath the screw head fasteners to inhibit galvanic corrosion from the steel screw to the aluminum deck panel 102. In one embodiment, steel nuts can be plated to provide an electrolysis barrier. In one embodiment, barrel nuts having relatively wide and thin surfaces on the outside can be used and mounted through the top of the deck panel 102 so that packages may slide across the top of the deck panel 102 without being damaged. The unique hinge assembly 200 design lies flat thereby minimizing protruding features. Consequently, uneven surfaces that may cause an operator standing on the deck to potentially trip are minimized.

In one embodiment, the gaps between the moving parts of the hinge assembly 200 including the distance between opposing hinge members 230 and between link members 220 are a minimum of at least one inch. For example, the gap between the opposing hinge members 230 (e.g. hinge member gap) and a gap between the link members 220 (e.g. link member gap) are preferably more than one inch. Such embodiment is advantageous as such distance helps to prevent serious injury to an operator's fingers and eliminates a potential pinch point. Similarly, in one embodiment, a one-inch gap exists between adjacent foldable decks 100. The upper gap limits (link member gap, hinge gap, and foldable decks gap) can be influenced by the size required to prevent packages from slipping through the gaps. Hence, in one embodiment, such gaps are less than about 1.5 inches.

As previously stated, the foldable deck 100 comprises one or more independent struts 180. As previously noted, although in one embodiment the shelf extrusions are approximately 70% aluminum and 30% steel, it should be noted that the force from each strut 180 helps direct the load through parts made predominantly of steel and relieves load imparted on the deck panel 102, thereby increasing the life of the shelf system. Referring to FIGS. 1A-B, the strut force travels through the lower strut mounting bolt to the mounting bracket 170, to the shelf mounting pin about which the foldable deck 100 pivots, to the shelf end bracket, up through the hollow cavity of the pivot-side deck panel 102, out of the shelf extrusion 112 114 through a side hole to the upper strut mounting bolt. This load path is a closed loop through materials made predominantly of steel material. The shelf end bracket is the primary load bearing component and although highly loaded in tension, provides cradling support to the foldable deck, thereby minimizing the load the foldable deck receives from the struts.

While this invention has been particularly shown and described with reference to a preferred embodiment, it will be understood by those skilled in the art that various changes in form and detail may be made therein without departing from the spirit and scope of the invention.

What is claimed is:

1. A double jointed hinge assembly comprising:
   a first end angle;
   a first link member adjacent said first end angle;
   a pair of opposing hinge members between said first link member and a second link member; and
   a second end angle adjacent said second link member,
   wherein a pair of slot pins and a pair of pivot pins are disposed through said first link member, said hinge members, and said second link member,
   wherein said slot pins rotate concentrically about said pivot pin between an upright stopping position and a deployed stopping position.

2. The double jointed hinge assembly of claim 1, further comprising a pivoting hinge guard having a slot pin receiving area, said pivoting hinge guard being disposed between said first or said second link member and a hinge member, wherein one of said pair of slot pins is disposed in said slot pin receiving area.

3. The double jointed hinge assembly of claim 1, further comprising a hinge guard having a pair of arcs slotted to permit movement of said pair of slot pins, said hinge guard being disposed between said first or said second link member and a hingemember.

4. The double jointed hinge assembly of claim 1 wherein said hinge member further comprises a magnet.

5. The double jointed hinge assembly of claim 1 wherein said pair of opposing hinge members have a hinge member gap, said hinge member gap being at least one inch.

6. The double jointed hinge assembly of claim 1 further having a link member gap between said first link member and said second link member, said link member gap being at least one inch.

7. A foldable deck for supporting cargo in a freight compartment comprising:
   a first deck panel pivot mounted to a mounting sidewall;
   a second deck panel connected to said first deck panel by the double jointed hinge assembly of claim 1,
   wherein said double jointed hinge assembly alternates between an upright stopped position and a deployed stopped position.

8. The foldable deck of claim 7 further comprising a torque tube, said torque tube placed through vertical walls of said first or second deck panel and through a cavity in said hinge member.

9. The foldable deck of claim 7 further comprising a strut attached to a vertical wall of said first deck panel.

10. The foldable deck of claim 9 wherein said strut is mounted on a pin having a ball to permit rotation of said strut.

11. The foldable deck of claim 9 wherein said strut comprises a mechanical spring.

12. A foldable deck for supporting cargo in a freight compartment comprising:
    a first deck panel mounted to a mounting sidewall;
    a second deck panel removably attached to a catch rail, said second deck panel connected to said first deck panel by a double jointed hinge, said double jointed hinge comprising:
       a pair of first and second hinge members, said first hinge member attached to said first deck panel and said second hinge member attached to said second deck panel;
       a pair of link members for each pair of hinge members, each of said link members being adjacent to said first hinge member and said second hinge member;
    wherein a pair of slot pins and a pair of pivot pins is disposed through said link members and said hinge members, and
    wherein said slot pins rotate concentrically about said pivot pins between an upright stopping position and a deployed stopping position.

13. The foldable deck of claim 12, further comprising a double jointed hinge assembly, said double jointed hinge assembly comprising two or more double jointed hinges wherein said double jointed hinges are connected by a center member.

14. The foldable deck of claim 13, further comprising a plurality hinge guards having a pair of arcs slotted to permit movement of said of slot pins, said hinge guards being disposed between each pair of hinge members and each link member.

15. The foldable deck of claim 13, further comprising a plurality pivoting binge guards, each pivoting hinge guard having a slot pin receiving area, said pivoting hinge guard being disposed between a link member and a hinge member, wherein one of said pair of slot pins is disposed in said slot pin receiving area.

16. The foldable deck of claim 13, further comprising at least one torque tube disposed through vertical walls of either said first or second deck panel and through a cavity of a hinge member.

17. The foldable deck of claim 16, further comprising at least one torque plate disposed along a vertical wall of either said first or second deck panel and through a cavity of a hinge member, wherein said torque plate is in communication with said torque tube.

18. The foldable deck of claim 12, wherein said first hinge member further comprises a magnet.

19. The foldable deck of claim 12 further comprising a strut attached to a vertical wall of said first deck panel.

20. The foldable deck of claim 19 wherein said strut is mounted on a pin having a ball to permit rotation of said strut.

21. The foldable deck of claim 19 wherein said strut comprises a mechanical spring.

* * * * *